(12) United States Patent
Kato et al.

(10) Patent No.: US 11,002,883 B2
(45) Date of Patent: May 11, 2021

(54) THERMOPLASTIC RESIN COMPOSITION AND MOLDED ARTICLE THEREOF

(71) Applicant: MITSUBISHI GAS CHEMICAL COMPANY, INC., Tokyo (JP)

(72) Inventors: Noriyuki Kato, Tokyo (JP); Mitsuteru Kondo, Tokyo (JP); Munenori Shiratake, Tokyo (JP); Kentaro Ishihara, Tokyo (JP); Koji Hirose, Tokyo (JP); Shinya Ikeda, Tokyo (JP)

(73) Assignee: MITSUBISHI GAS CHEMICAL COMPANY, INC., Tokyo (JP)

( * ) Notice: Subject to any disclaimer, the term of this patent is extended or adjusted under 35 U.S.C. 154(b) by 407 days.

(21) Appl. No.: 15/770,401

(22) PCT Filed: Nov. 2, 2016

(86) PCT No.: PCT/JP2016/082618
§ 371 (c)(1),
(2) Date: Apr. 23, 2018

(87) PCT Pub. No.: WO2017/078076
PCT Pub. Date: May 11, 2017

(65) Prior Publication Data
US 2018/0321423 A1  Nov. 8, 2018

(30) Foreign Application Priority Data
Nov. 4, 2015  (JP) .............................. JP2015-216980

(51) Int. Cl.
| | |
|---|---|
| *G02B 1/04* | (2006.01) |
| *C08L 67/00* | (2006.01) |
| *C08L 69/00* | (2006.01) |
| *C08K 5/3492* | (2006.01) |
| *C08K 5/07* | (2006.01) |
| *C08K 5/3475* | (2006.01) |
| *C08G 64/30* | (2006.01) |
| *C08K 5/23* | (2006.01) |
| *C08L 71/08* | (2006.01) |
| *C08K 5/00* | (2006.01) |

(52) U.S. Cl.
CPC ............. *G02B 1/04* (2013.01); *C08G 64/307* (2013.01); *C08K 5/07* (2013.01); *C08K 5/235* (2013.01); *C08K 5/3475* (2013.01); *C08K 5/3492* (2013.01); *C08L 67/00* (2013.01); *C08L 69/00* (2013.01); *C08L 71/08* (2013.01); *G02B 1/041* (2013.01); *C08K 5/005* (2013.01)

(58) Field of Classification Search
CPC ....................................................... G02B 1/04
See application file for complete search history.

(56) References Cited

U.S. PATENT DOCUMENTS

| | | | |
|---|---|---|---|
| 6,011,648 A | 1/2000 | Mukai et al. | |
| 2005/0250930 A1 | 11/2005 | Ikeda et al. | |
| 2010/0067101 A1 | 3/2010 | Suetsugu et al. | |
| 2011/0026109 A1 | 3/2011 | Yamakawa et al. | |
| 2012/0095139 A1 | 4/2012 | Yoshida et al. | |
| 2015/0285954 A1 * | 10/2015 | Ishizuka ................ | C08G 64/06 528/201 |

FOREIGN PATENT DOCUMENTS

| | | | |
|---|---|---|---|
| JP | 6-238689 | 8/1994 | |
| JP | 10-101787 | 4/1998 | |
| JP | 2000-136220 | 5/2000 | |
| JP | 2000/255540 A1 | 9/2000 | |
| JP | 2004-176052 | 6/2004 | |
| JP | 2005-15505 | 1/2005 | |
| JP | 2005-206830 | 8/2005 | |
| JP | 2010-248445 | 11/2010 | |
| JP | 2014-185325 | 10/2014 | |
| WO | 2008/123378 | 10/2008 | |
| WO | 2014/073496 | 5/2014 | |
| WO | WO-2014073496 A1 * | 5/2014 | ........... C08G 64/307 |

OTHER PUBLICATIONS

International Search Report issued in International Bureau of WIPO Patent Application No. PCT/JP2016/082618, dated Jan. 24, 2017.

\* cited by examiner

*Primary Examiner* — Larry W Thrower
(74) *Attorney, Agent, or Firm* — Greenblum & Bernstein, P.L.C.

(57) ABSTRACT

The present invention provides a resin composition comprising a thermoplastic resin comprising a constituting unit (A) derived from a compound represented by the following general formula (1), wherein
the resin composition comprises an ultraviolet absorber in an amount of 2,000 ppm to 40,000 ppm:

(1)

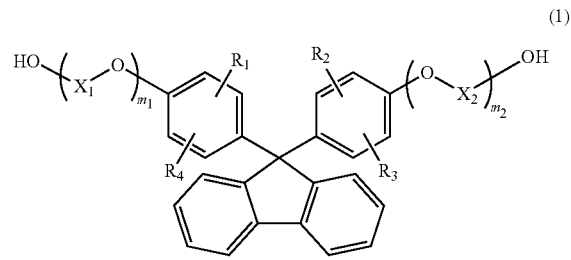

19 Claims, No Drawings

THERMOPLASTIC RESIN COMPOSITION AND MOLDED ARTICLE THEREOF

TECHNICAL FIELD

The present invention relates to a thermoplastic resin composition having high ultraviolet absorbency and high bending strength, and a molded body thereof.

BACKGROUND ART

In recent years, electronic devices such as digital cameras, smart phones and tablets have become popular, and molded bodies equipped into such electronic devices, such as optical lenses, have progressed, in terms of miniaturization and weight saving. In general, a thermoplastic resin, such as a polycarbonate resin consisting of bisphenol A (BPA-PC), has been widely used as a transparent material for optical use. However, such a polycarbonate resin such as BPA-PC has been problematic in terms of large birefringence.

Under such circumstances, a resin comprising, as a raw material monomer, a dihydroxy compound having a fluorene skeleton, such as biscresol fluorene or bisphenoxyethanol fluorene, has been developed as a resin having small birefringence (Patent Literature 1 and Patent Literature 2). Moreover, a resin comprising, as a raw material monomer, a dihydroxy compound having a binaphthalene skeleton has been developed as a material having a high refractive index and low birefringence (Patent Literature 3).

In general, for the purpose of cutting ultraviolet rays, an ultraviolet cutting layer or an ultraviolet cutting filter is equipped into an optical lens unit, or the lens is coated with a resin comprising an ultraviolet absorber (Patent Literatures 4 to 6).

However, taking into consideration the miniaturization or weight saving of an electronic device, and further, the cost reduction thereof, it is desired not to attach such an ultraviolet cutting layer or an ultraviolet cutting filter to the optical lens unit. In addition, the method of coating a lens with a resin comprising an ultraviolet absorber tends to deteriorate the properties of the lens, and the processing performed on plastic lenses, which are produced in large quantities by injection molding, is not appropriate even in terms of costs.

In contrast to these methods, there may also be a case where an ultraviolet absorber is kneaded into a resin itself (Patent Literature 7). However, as a result of studies conducted by the present inventors, it was revealed that when additives such as an ultraviolet absorber are added to a resin, the strength of the obtained molded body tends to be decreased. In particular, with the thinning of electronic devices, components to be equipped into the devices, such as optical lenses, are required to have ultraviolet-absorbing ability and a high bending strength property, as well as conventional optical properties, and thus, it is desired to develop a resin composition achieving all of these performances.

CITATION LIST

Patent Literature

Patent Literature 1: JP-10-101787 A (1998)
Patent Literature 2: JP-2005-015505 A
Patent Literature 3: International Publication WO 2014/073496
Patent Literature 4: International Publication WO 2008/123378
Patent Literature 5: JP-06-238689 A (1994)
Patent Literature 6: JP-2009-048027 A
Patent Literature 7: JP-2005-206830 A

SUMMARY OF INVENTION

Technical Problem

It is an object of the present invention to provide a thermoplastic resin composition having high ultraviolet-absorbing ability and high bending strength property, and a molded body thereof.

Solution to Problem

As a result of intensive studies directed towards achieving the aforementioned object, the present inventors have found that the aforementioned object can be achieved by mixing a thermoplastic resin having a specific structure with a specific amount of ultraviolet absorber, thereby completing the present invention.

Specifically, the present invention is, for example, as follows.

[1] A resin composition comprising a thermoplastic resin comprising a constituting unit (A) derived from a compound represented by the following general formula (1), wherein the resin composition comprises an ultraviolet absorber in an amount of 2,000 ppm to 40,000 ppm,

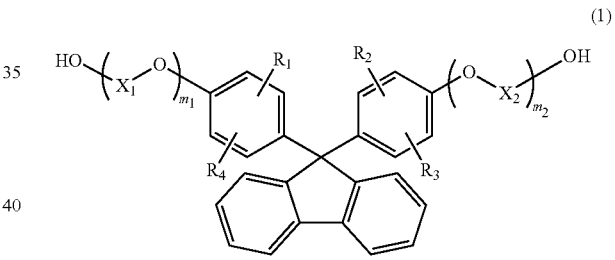

wherein $R_1$ to $R_4$ are each independently selected from the group consisting of a hydrogen atom, an alkyl group containing 1 to 20 carbon atoms, an alkoxyl group containing 1 to 20 carbon atoms, a cycloalkyl group containing 5 to 20 carbon atoms, a cycloalkoxyl group containing 5 to 20 carbon atoms, an aryl group containing 6 to 20 carbon atoms, and an aryloxy group containing 6 to 20 carbon atoms;

$X_1$ and $X_2$ are each independently selected from the group consisting of an alkylene group containing 2 to 8 carbon atoms, a cycloalkylene group containing 5 to 12 carbon atoms, and an arylene group containing 6 to 20 carbon atoms; and $m_1$ and $m_2$ each independently represent an integer of 1 to 5.

[2] The resin composition according to the above [1], wherein the ultraviolet absorber is at least one selected from the group consisting of benzotriazole-based, triazine-based, and benzophenone-based ultraviolet absorbers.

[3] The resin composition according to the above [2], wherein the ultraviolet absorber is a benzotriazole-based ultraviolet absorber.

[4] The resin composition according to any one of the above [1] to [3], wherein the thermoplastic resin further comprises at least one constituting unit selected from the group consisting of a constituting unit (B) derived from a compound represented by the following general formula (2) and a constituting unit (C) derived from a compound represented by the following general formula (3).

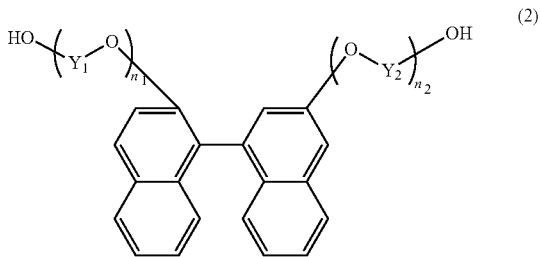

wherein $Y_1$ and $Y_2$ each independently represent an alkylene group containing 1 to 8 carbon atoms; and $n_1$ and $n_2$ each independently represent an integer of 1 to 5, and

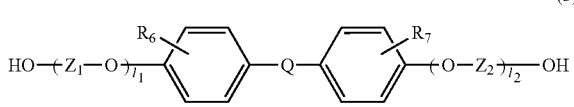

wherein $R_6$ and $R_7$ are each independently selected from the group consisting of a hydrogen atom, an alkyl group containing 1 to 20 carbon atoms, an alkoxyl group containing 1 to 20 carbon atoms, a cycloalkyl group containing 5 to 20 carbon atoms, a cycloalkoxyl group containing 5 to 20 carbon atoms, an aryl group containing 6 to 20 carbon atoms, an aryloxy group containing 6 to 20 carbon atoms, and a halogen atom;

$Z_1$ and $Z_2$ are each independently selected from the group consisting of an alkylene group containing 1 to 8 carbon atoms, a cycloalkylene group containing 6 to 10 carbon atoms, and an arylene group containing 6 to 10 carbon atoms;

$l_1$ and $l_2$ each independently represent an integer of 0 to 5;

Q represents a single bond or is selected from the group consisting of:

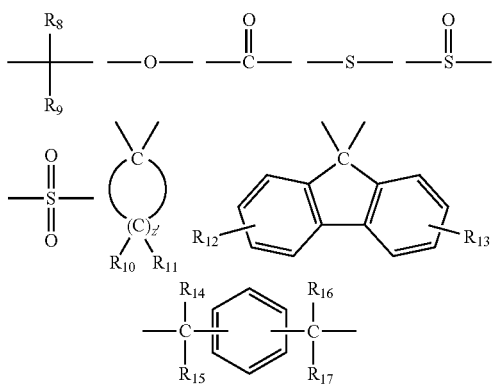

wherein $R_8$, $R_9$, and $R_{14}$ to $R_{17}$ are each independently selected from the group consisting of a hydrogen atom, an alkyl group containing 1 to 10 carbon atoms, and a phenyl group;

$R_{10}$ to $R_{13}$ each independently represent a hydrogen atom or an alkyl group containing 1 to 5 carbon atoms;

Z' represents an integer of 3 to 11; and $R_6$ and $R_7$ may be identical to or different from each other.

[5] The resin composition according to the above [4], wherein
the thermoplastic resin comprises the constituting unit (B), and
the molar ratio between the constituting unit (A) and the constituting unit (B) is the constituting unit (A):the constituting unit (B)=20:80 to 80:20.

[6] The resin composition according to any one of the above [1] to [5], wherein, in the general formula (1), both $X_1$ and $X_2$ represent ethylene.

[7] The resin composition according to any one of the above [1] to [6], wherein, in the general formula (1), both $m_1$ and $m_2$ represent 1.

[8] The resin composition according to any one of the above [1] to [7], wherein the compound represented by the general formula (1) is selected from the group consisting of 9,9-bis(4-(2-hydroxyethoxy)phenyl)fluorene and 9,9-bis(4-(2-hydroxyethoxy)-3-phenylphenyl)fluorene.

[9] The resin composition according to the above [4], wherein, in the general formula (2), both $Y_1$ and $Y_2$ represent ethylene.

[10] The resin composition according to the above [4] or [9], wherein, in the general formula (2), both $n_1$ and $n_2$ represent 1.

[11] The resin composition according to the above 191 or [10], wherein the compound represented by the general formula (2) is 2,2'-bis(2-hydroxyethoxy)-1,1'-binaphthalene.

[12] The resin composition according to the above [4], wherein, in the general formula (3),
$l_1$ and $l_2$ represent 0, and
Q represents:

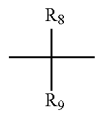

wherein $R_8$ and $R_9$ are as defined in the general formula (3).

[13] The resin composition according to the above [12], wherein the compound represented by the general formula (3) is bisphenol A.

[14] The resin composition according to any one of the above [1] to [13], wherein the thermoplastic resin is selected from the group consisting of a polycarbonate resin, a polyester resin, and a polyester carbonate resin.

[15] The resin composition according to the above [14], wherein the thermoplastic resin is a polycarbonate resin.

[16] The resin composition according to any one of the above [1] to [15], wherein the light transmittance at a wavelength of 410 nm is 50% or less.

[17] The resin composition according to any one of the above [1] to [16], wherein the weight average molecular weight of the thermoplastic resin is 10,000 to 100,000.

[18] The resin composition according to any one of the above [1] to [17], which further comprises an antioxidant and/or a release agent.

[19] A molded body comprising the resin composition according to any one of the above [1] to [18].

[20] The molded body according to the above [19], which is an optical film.
[21] The molded body according to the above [19], which is an optical lens.

Effects of Invention

According to the present invention, a thermoplastic resin having high ultraviolet-absorbing ability and high bending strength, and a molded body thereof, can be obtained.

DESCRIPTION OF EMBODIMENTS

Hereinafter, the present invention will be described in detail in the following embodiments, illustrations and the like. However, the present invention is not limited to these embodiments, illustrations and the like, and the present invention can be carried out by being arbitrarily modified in a range in which such modification is not deviated from the gist of the present invention.

One embodiment of the present invention relates to a resin composition comprising a thermoplastic resin comprising a constituting unit (A) derived from a compound represented by the following general formula (1), the resin composition comprising an ultraviolet absorber in an amount of 2,000 ppm to 40,000 ppm.

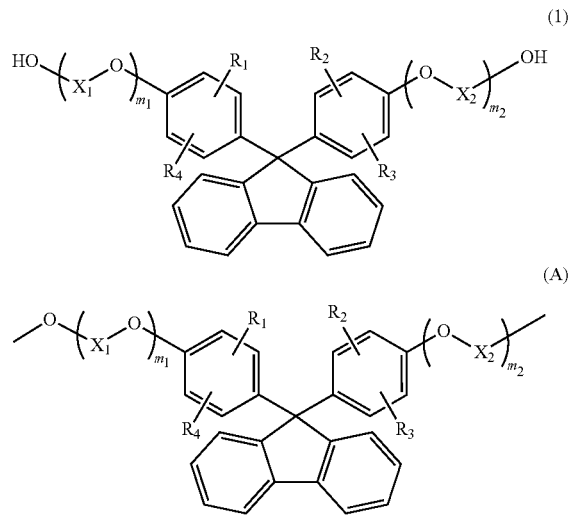

A resin comprising the compound of the above general formula (1) as a raw material exhibits physical properties such as a high refractive index, a low Abbe number, high transparency, a glass transition temperature suitable for injection molding, and low birefringence. By using this resin, optical components, such as excellent optical lens having substantially no optical distortion, can be obtained.

The present inventors have found that a resin produced using the compound represented by the above general formula (1) as a raw material is mixed with a specific amount of ultraviolet absorber, so that high ultraviolet absorbency can be achieved, while the bending strength of the obtained molded body is maintained. Moreover, since such an ultraviolet absorber is mixed into the resin itself in the resin composition of the present invention, the mass production thereof can be carried out by injection molding, and further, since it is not necessary to establish a separated ultraviolet absorbing layer, it achieves high productivity and inexpensiveness.

<Thermoplastic Resin>

The thermoplastic resin according to the embodiment of the present invention comprises the constituting unit (A) derived from the compound represented by the general formula (1). As a thermoplastic resin used herein, a polyester resin, a polyester carbonate resin, or a polycarbonate resin is preferable. Among others, the thermoplastic resin preferably comprises a polycarbonate resin, since the polycarbonate resin is excellent in heat resistance and hydrolysis resistance. The thermoplastic resin may comprise the aforementioned resins, alone or in combination of two or more types.

Optical properties such as refractive index, Abbe number, and birefringence value are greatly influenced by the chemical structure of a constituting unit. On the other hand, whether the chemical bond between constituting units is an ester bond or a carbonate bond has a relatively small influence on such optical properties. Moreover, also regarding the interaction with the ultraviolet absorber, the influence of the chemical structure of a constituting unit that constitutes a resin is large, and a change in the interaction with the ultraviolet absorber caused by a difference in the chemical bond (an ester bond or a carbonate bond) between constituting units is relatively small.

The thermoplastic resin according to the embodiment of the present invention is produced, for example, by performing polycondensation using, as a raw material, the compound represented by the general formula (1). In the compound represented by the general formula (1), the functional group contributing to polycondensation is an alcoholic hydroxyl group or a phenolic hydroxyl group. By reacting the compound represented by the general formula (1) with a carbonic acid diester and/or a dicarboxylic acid or a derivative thereof according to a polycondensation reaction, the constituting unit (A) derived from the compound represented by the general formula (1) is allowed to bind to the carbonic acid diester and/or the dicarboxylic acid or a derivative thereof via a carbonate bond and/or an ester bond. That is to say, the thermoplastic resin according to the embodiment of the present invention comprises a constituting unit derived from the dihydroxy compound represented by the above general formula (1).

In the general formula (1), $R_1$ to $R_4$ each independently represent a hydrogen atom, an alkyl group containing 1 to 20 carbon atoms, an alkoxyl group containing 1 to 20 carbon atoms, a cycloalkyl group containing 5 to 20 carbon atoms, a cycloalkoxyl group containing 5 to 20 carbon atoms, an aryl group containing 6 to 20 carbon atoms, or an aryloxy group containing 6 to 20 carbon atoms. Among others, a compound, in which $R_1$ to $R_4$ each represent a hydrogen atom, is preferable, since melt fluidity becomes favorable when the compound is molded to obtain an optical lens. In addition, since the optical properties of the thermoplastic resin become favorable, a compound, in which $R_1$ and $R_2$ each represent a hydrogen atom and $R_3$ and $R_4$ each represent an aryl group containing 6 to 20 carbon atoms (preferably, a phenyl group), is also preferable.

In the general formula (1), $X_1$ and $X_2$ each independently represent an alkylene group containing 2 to 8 carbon atoms, a cycloalkylene group containing 5 to 12 carbon atoms, or an arylene group containing 6 to 20 carbon atoms. Among others, an alkylene group containing 2 to 8 carbon atoms is preferable because it provides good fluidity of the thermoplastic resin. As the number of carbon atoms possessed by $X_1$ and $X_2$ increases, the melt viscosity decreases and toughness and moldability are improved. Thus, a compound having an alkylene group containing 2 or more carbon atoms is preferable. On the other hand, as the number of carbon atoms increases, the glass transition temperature decreases. Thus, an alkylene group containing 3 or less carbon atoms is preferable in terms of heat resistance. From the viewpoint of achieving both molding easiness and heat resistance, the number of carbon atoms is more preferably 2 or 3, and in particular, from the viewpoint of being also excellent in the refractive index and the production and distribution of monomers, $X_1$ and $X_2$ are preferably an ethylene group containing 2 carbon atoms.

In the general formula (1), $m_1$ and $m_2$ each independently represent an integer of 1 to 5. Among others, from the viewpoint of excellent heat stability and easy availability $m_1$ and $m_2$ are preferably 1.

Examples of the compound represented by the general formula (1) include 9,9-bis(4-(2-hydroxyethoxy)phenyl)fluorene, 9,9-bis(4-(2-hydroxyethoxy)-3-methylphenyl)fluorene, 9,9-bis(4-(2-hydroxyethoxy)-3,5-dimethylphenyl)fluorene, 9,9-bis(4-(2-hydroxyethoxy)-3-tert-butylphenyl)fluorene, 9,9-bis(4-(2-hydroxyethoxy)-3-isopropylphenyl)fluorene, 9,9-bis(4-(2-hydroxyethoxy)-3-cyclohexylphenyl)fluorene, and 9,9-bis(4-(2-hydroxyethoxy)-3-phenylphenyl)fluorene. Among these compounds, 9,9-bis(4-(2-hydroxyethoxy)-3-phenylphenyl)fluorene and 9,9-bis(4-(2-hydroxyethoxy)phenyl)fluorene are preferable, and 9,9-bis(4-(2-hydroxyethoxy)phenyl)fluorene is more preferable. These compounds may be used alone, or may also be used in combination of two or more types.

By using such a dihydroxy compound as a raw material, the obtained thermoplastic resin has the constituting unit (A) derived from the compound represented by the general formula (1).

The percentage of the constituting unit (A) is preferably 1 to 100 mol %, based on all constituting units that constitute the thermoplastic resin. The percentage of the constituting unit (A) is more preferably 30 to 100 mol %, and further preferably 40 to 100 mol %, based on all constituting units that constitute the thermoplastic resin.

(Other Constituting Units)

The thermoplastic resin according to the embodiment may comprise constituting units derived from dihydroxy compounds other than the compound of the general formula (1). For example, the thermoplastic resin further comprises at least one constituting unit selected from the group consisting of a constituting unit (B) derived from a compound represented by the following general formula (2) and a constituting unit (C) derived from a compound represented by the following general formula (3), as well as the constituting unit (A) derived from the compound represented by the general formula (1).

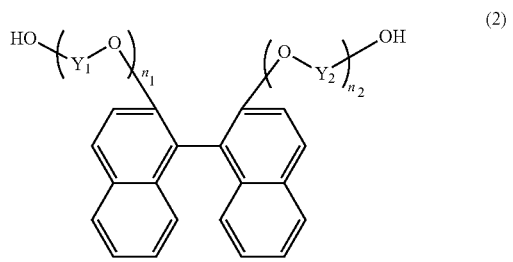

(2)

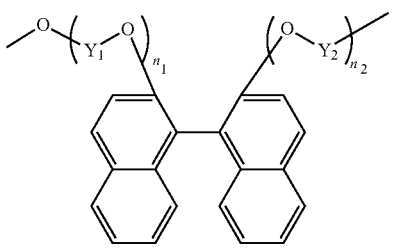

(B)

In the compound represented by the general formula (2), the functional group contributing to polycondensation is an alcoholic hydroxyl group. The constituting unit (B) derived from the compound represented by the general formula (2) contributes to a high refractive index, and at the same time, it also contributes to a reduction in the Abbe number, rather than the constituting unit (A) derived from the compound represented by the general formula (1). By allowing the thermoplastic resin to comprise the constituting unit (A) and the constituting unit (B), the effect of reducing the birefringence value of the entire resin and reducing the optical distortion of an optical molded body can be obtained.

The total percentage of the above-described constituting unit (A) and constituting unit (B) is preferably 50 mol 0% or more, more preferably 80 mol % or more, particularly preferably 90 mol % or more, and most preferably 100 mol %, based on all constituting units that constitute the thermoplastic resin. The molar ratio (A/B) between the constituting unit (A) and the constituting unit (B) is preferably 20/80 to 80/20, more preferably 30/70 to 80/20, and particularly preferably 40/60 to 80/20.

In the general formula (2). $Y_1$ and $Y_2$ each independently represent an alkylene group containing 1 to 8 carbon atoms. Among others, both $Y_1$ and $Y_2$ represent an alkylene group containing 1 to 4 carbon atoms, since the fluidity of the resin becomes favorable. More preferably, both $Y_1$ and $Y_2$ represent an ethylene group.

In the general formula (2), $n_1$ and $n_2$ each independently represent an integer of 1 to 5. Among others, in terms of excellent heat stability and easy availability, both $n_1$ and $n_2$ are preferably 1.

Examples of the dihydroxy compound represented by the general formula (2) include 2,2'-bis(1-hydroxymethoxy)-1,1'-binaphthalene, 2,2'-bis(2-hydroxyethoxy)-1,1'-binaphthalene, 2,2'-bis(3-hydroxypropyloxy)-1,1'-binaphthalene, and 2,2'-bis(4-hydroxybutoxy)-1,1'-binaphthalene. Among these compounds, 2,2'-bis(2-hydroxyethoxy)-1,1'-binaphthalene is preferable. These compounds may be used alone, or may also be used in combination of two or more types.

By using such a dihydroxy compound as a raw material, the obtained thermoplastic resin has the constituting unit (B) derived from the compound represented by the general formula (2).

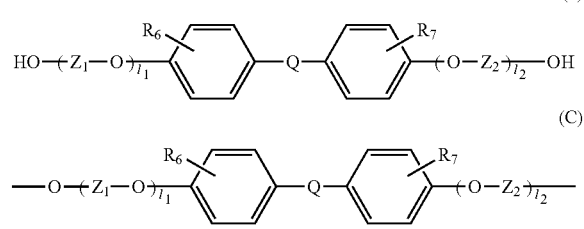

(3)

(C)

In the compound represented by the general formula (3), the functional group contributing to polycondensation is an alcoholic hydroxyl group or a phenolic hydroxyl group. The constituting unit (C) derived from the compound represented by the general formula (3) contributes to a high refractive index, and at the same time, it also contributes to a reduction in the Abbe number, rather than the constituting unit (A) derived from the compound represented by the general formula (1). By allowing the thermoplastic resin to comprise the constituting unit (A) and the constituting unit (C), the effect of reducing the birefringence value of the entire resin and reducing the optical distortion of an optical molded body can be obtained.

The total percentage of the above-described constituting unit (A) and constituting unit (C) is preferably 50 mol % or more, more preferably 80 mol % or more, particularly preferably 90 mol % or more, and most preferably 100 mol %, based on all constituting units that constitute the thermoplastic resin. The molar ratio (A/C) between the constituting unit (A) and the constituting unit (C) is preferably 20/80 to 99/1, more preferably 30/70 to 95/5, and particularly preferably 40/60 to 90/10.

In the general formula (3), $R_6$ and $R_7$ are each independently selected from the group consisting of a hydrogen atom, an alkyl group containing 1 to 20 carbon atoms, an alkoxyl group containing 1 to 20 carbon atoms, a cycloalkyl group containing 5 to 20 carbon atoms, a cycloalkoxyl group containing 5 to 20 carbon atoms, an aryl group containing 6 to 20 carbon atoms, an aryloxy group containing 6 to 20 carbon atoms, and a halogen atom (F, Cl, Br, or I). Among others, a hydrogen atom and a methyl group are preferable, since this compound causes small amounts of impurities and is distributed in a large amount.

In the general formula (3), $Z_1$ and $Z_2$ are each independently selected from the group consisting of an alkylene group containing 1 to 8 carbon atoms, a cycloalkylene group containing 6 to 10 carbon atoms, and an arylene group containing 6 to 10 carbon atoms. Among others, a cycloalkylene group containing 6 carbon atoms and an arylene group containing 6 carbon atoms are preferable because these are excellent in heat resistance.

In the general formula (3), $l_1$ and $l_2$ each independently represent an integer of 0 to 5. Among others, $l_1$ and $l_2$ are 0, because of excellent heat resistance.

In the general formula (3), Q is a single bond or is selected from the group consisting of:

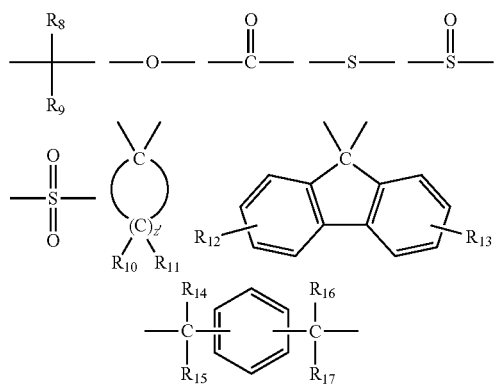

wherein $R_8$, $R_9$, and $R_{14}$ to $R_{17}$ are each independently selected from the group consisting of a hydrogen atom, an alkyl group containing 1 to 10 carbon atoms, and a phenyl group;

$R_{10}$ to $R_{17}$ each independently represent a hydrogen atom or an alkyl group containing 1 to 5 carbon atoms:
Z' represents an integer of 3 to 11; and
$R_6$ and $R_7$ may be the same or different from each other.

Among others, because of excellent heat resistance, it is preferable that $l_1$ and $l_2$ in the above formula (3) be 0, and that Q be the following:

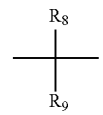

wherein $R_8$ and $R_9$ are as defined in the above general formula (3).

Examples of the dihydroxy compound represented by the general formula (3) include 4,4-bis(4-hydroxyphenyl)propane (i.e., bisphenol A), 1,1-bis(4-hydroxyphenyl)-1-phenylethane (i.e., bisphenol AP), 2,2-bis(4-hydroxyphenyl)hexafluoropropane (i.e., bisphenol AF), 2,2-bis(4-hydroxyphenyl)butane (i.e., bisphenol B), bis(4-hydroxyphenyl)diphenylmethane (i.e., bisphenol BP), bis(4-hydroxy-3-methylphenyl)propane (i.e., bisphenol C), 2,2-bis(4-hydroxy-3,5-dimethylphenyl)propane, 2,2-bis(4-hydroxy-3,5-diethylphenyl)propane, 2,2-bis(4-hydroxy-(3,5-diphenyl)phenyl)propane, 2,2-bis(4-hydroxy-3,5-dibromophenyl)propane, 1,1-bis(4-hydroxyphenyl)ethane (i.e., bisphenol E), bis(4-hydroxyphenyl)methane (i.e., bisphenol F), 2,4'-dihydroxy-diphenylmethane, bis(2-hydroxyphenyl)methane, 2,2-bis(4-hydroxy-3-isopropylphenyl)propane (i.e., bisphenol G), 1,3-bis(2-(4-hydroxyphenyl)-2-propyl)benzene (i.e., bisphenol M), bis(4-hydroxyphenyl)sulfone (i.e., bisphenol S), 2,4'-dihydroxydiphenylsulfone, bis(4-hydroxyphenyl)sulfide, 1,4-bis(2-(4-hydroxyphenyl)-2-propyl)benzene (i.e., bisphenol P), bis(4-hydroxy-3-phenylphenyl)propane (i.e., bisphenol PH), 1,1-bis(4-hydroxyphenyl)-3,3,5-trimethylcyclohexane (i.e., bisphenol TMC), 1,1-bis(4-hydroxyphenyl)cyclohexane (i.e., bisphenol Z), 1,1-bis(4-hydroxy-3-methylphenyl)cyclohexane (i.e., bisphenol OCZ), 3,3-bis(4-hydroxyphenyl)pentane, 4,4-biphenol, 9,9-bis(4-(2-hydroxyethoxy)phenyl)fluorene, 9,9-bis(4-hydroxy-2-methylphenyl)fluorene, 9,9-bis(4-hydroxyphenyl)fluorene, 9,9-bis(4-(2-hydroxyethoxy)-3-methylphenyl)fluorene, 9,9-bis(4-(2-hydroxyethoxy)-3-tert-butylphenyl)fluorene, 9,9-bis(4-(2-hydroxyethoxy)-3-isopropylphenyl)fluorene, 9,9-bis(4-(2-hydroxyethoxy)-3-cyclohexylphenyl)fluorene, 9,9-bis(4-(2-hydroxyethoxy)-3-phenylphenyl)fluorene, 2,2-bis(4-hydroxyphenyl)pentane, 4,4'-dihydroxydiphenyl ether, and 4,4'-dihydroxy-3,3'-dichlorodiphenyl ether. The dihydroxy compound represented by the general formula (3) is particularly preferably bisphenol A, since bisphenol A has versatility, is available at a low cost as a good monomer which does not comprise impurities such as metal contents, and is excellent in heat resistance.

By using such a dihydroxy compound as a raw material, the obtained thermoplastic resin has the constituting unit (C) derived from the compound represented by the general formula (3).

<Other Dihydroxy Components>

The thermoplastic resin may comprise constituting units derived from dihydroxy compounds other than the above-described compounds of the general formulae (1) to (3). Examples of such other dihydroxy compounds include: alicyclic dihydroxy compounds such as tricyclodecane [$5.2.1.0^{2,6}$]dimethanol, pentacyclopentadecane dimethanol, cyclohexane-1,2-dimethanol, cyclohexane-1,4-dimethanol, cyclohexane-1,3-dimethanol, decaline-2,6-dimethanol, decaline-2,3-dimethanol, decaline-1,5-dimethanol, 2,3-norbornane dimethanol, 2,5-norbornane dimethanol, or 1,3-adamantane dimethanol; and aliphatic dihydroxy compounds such as ethylene glycol, 1,3-propanediol, 1,2-propanediol, 1,4-butanediol, 1,3-butanediol, 1,2-butanediol, 1,5-pentanediol, 1,6-hexanediol, 1,5-heptanediol, 1,8-octanediol, 1,9-nonanediol, 1,10-decanediol, or spiroglycol.

Other dihydroxy compounds are added in an amount of desirably 20 mol % or less, and more desirably 10 mol % or less, based on 100 mol % of the constituting unit (A) derived from the compound of the general formula (1). If the amount of other hydroxyl compounds is in this range, a high refractive index can be retained.

In order to maintain optical distortion at a low level, the thermoplastic resin is preferably a resin consisting of the constituting unit (A) (first aspect); a resin consisting of the constituting unit (A) and the constituting unit (B) (second aspect); a resin consisting of the constituting unit (A) and the constituting unit (C) (third aspect); or a resin consisting of the constituting unit (A), the constituting unit (B) and the constituting unit (C) (fourth aspect). The thermoplastic resins of the first aspect to the fourth aspect (polycarbonate resin, polyester resin, and polyester carbonate resin) may be used by being mixed with one another, or can also be used by being mixed with other resins.

The weight average molecular weight of the thermoplastic resin is preferably 10,000 to 100,000. The weight average molecular weight (Mw) of the thermoplastic resin means a weight average molecular weight in terms of styrene, and it is measured by the method described in the after-mentioned Examples. If Mw is 10,000 or more, the brittleness reduction of the molded body is prevented. If Mw is 100,000 or less, melt viscosity does not become too high, and thus, it is easy to remove the resin from a metallic mold upon molding. Moreover, good fluidity is achieved, and it is preferable for injection molding in a melted state. The weight average molecular weight (Mw) is more preferably 20,000 to 70,000, and further preferably 25,000 to 60,000.

When the thermoplastic resin is used in injection molding, the glass transition temperature (Tg) is preferably 95° C. to 180° C., more preferably 110° C. to 170° C., further preferably 115° C. to 160° C., particularly preferably 125° C. to 145° C. If Tg is lower than 95° C., the range of the used temperature is unfavorably narrowed. On the other hand, if Tg exceeds 180° C., the melting temperature of the resin becomes high, and the decomposition or coloration of the resin is unfavorably easily generated. Moreover, when the glass transition temperature of the resin is too high, a different between the metallic mold temperature and the glass transition temperature of the resin becomes large, if a commonly used metallic mold temperature controller is used. Hence, in the intended use for which products are required to have high profile irregularity, it is difficult and thus unfavorable to use a resin having an extremely high glass transition temperature.

As an indicator of heat stability for enduring heating upon the injection molding of the thermoplastic resin, the 5% weight loss temperature (Td), which is measured at a temperature-increasing rate of 10° C./min, is preferably 350° C. or higher. When the 5% weight loss temperature is lower than 350° C., thermal decomposition significantly takes place upon molding, and thus, it unfavorably becomes difficult to obtain a good molded body.

The thermoplastic resin may have any structure of random, block, and alternating copolymers.

In the thermoplastic resin, phenol generated upon the production thereof or unreacted remaining carbonic acid diester is present as an impurity. The content of such phenol in the thermoplastic resin is preferably 0.1 to 3000 ppm, more preferably 0.1 to 2000 ppm, and particularly preferably 1 to 1000 ppm, 1 to 800 ppm, 1 to 500 ppm, or 1 to 300 ppm. In addition, the content of such carbonic acid diester in a polycarbonate resin or a polyester carbonate resin is preferably 0.1 to 1000 ppm, more preferably 0.1 to 500 ppm, and particularly preferably 1 to 100 ppm. By controlling the amounts of phenol and carbonic acid diester contained in the resin, a resin having physical properties depending on purpose can be obtained. The contents of phenol and carbonic acid diester can be controlled, as appropriate, by changing conditions or devices for polycondensation. Moreover, such contents can also be controlled by changing conditions applied in an extrusion step following polycondensation.

If the content of phenol or carbonic acid diester is higher than the above-described range, problems may occur, such as a reduction in the strength of the obtained resin molded body or generation of odor. On the other hand, if the content of phenol or carbonic acid diester is lower than the above-described range, it is likely that plasticity is reduced upon the melting of the resin.

The thermoplastic resin according to the embodiment desirably comprises foreign matters in extremely small amounts, and thus, it is preferable to carry out filtration of melted raw materials, filtration of a catalyst solution, and filtration of melted oligomers. The mesh size of a filter is preferably 7 μm or less, and more preferably 5 μm or less. Moreover, it is also preferable to filtrate the generated resin through a polymer filter. The mesh size of a polymer filter is preferably 100 μm or less, and more preferably 30 μm or less. Furthermore, a step of collecting resin pellets must be naturally carried out under a low-dust environment, and the class is preferably 6 or less, and more preferably 5 or less.

Hereafter, a polycarbonate resin will be exemplified and explained as a thermoplastic resin. A polyester resin and a polyester carbonate resin can also be carried out with reference to the description of the following (Polycarbonate resin), and/or by applying a publicly known method.

(Polycarbonate Resin)

The polycarbonate resin according to the embodiment is a polycarbonate resin comprising the constituting unit (A) derived from the compound represented by the general formula (1), and as necessary, the aforementioned other constituting units. The polycarbonate resin is generated by allowing a dihydroxy compound to react with a carbonate precursor substance such as carbonic acid diester, and in the polycarbonate resin, individual constituting units bind to one another via a carbonate bond.

Specifically, the polycarbonate resin can be produced by allowing a dihydroxy compound comprising the compound represented by the above general formula (1) to react with a carbonate precursor substance such as carbonic acid diester in the presence of a transesterification catalyst or in the absence of a catalyst according to a melt polycondensation method.

Examples of the carbonic acid diester include diphenyl carbonate, ditolyl carbonate, bis(chlorophenyl) carbonate, m-cresyl carbonate, dimethyl carbonate, diethyl carbonate, dibutyl carbonate, and dicyclohexyl carbonate. Among these compounds, diphenyl carbonate is particularly preferable. The diphenyl carbonate is used at a ratio of preferably 0.97 to 1.20 moles, and more preferably 0.98 to 1.10 moles, based on total 1 mole of the dihydroxy compound.

An example of the production method is a method comprising stirring dihydroxy compound components and carbonic acid diester to melt them under an inert gas atmosphere, while heating, and then polymerizing them, while distilling away the generated alcohols or phenols. The reaction temperature is different depending on the boiling point of the generated alcohols or phenols, etc., but it is generally in the range from 120° C. to 350° C. From the initial stage of the reaction, the pressure is reduced, and the reaction is then terminated while distilling away the generated alcohols or phenols. Moreover, in order to promote the reaction, a transesterification catalyst can also be used. The reaction may be carried out in a continuous system or in a batch system. The reactor used upon performing the reaction may be a vertical reactor equipped with an anchor impeller, a MAXBLEND impeller, a helical ribbon impeller, etc., or a horizontal reactor equipped with a paddle blade, a lattice blade, a spectacle blade etc., or an extruder-type reactor equipped with a screw. Furthermore, taking into consideration the viscosity of a polymer, a reactor, in which the aforementioned reactors are appropriately combined with one another, can preferably be used.

As such a transesterification catalyst, a basic compound catalyst is used. Examples of such a basic compound catalyst include an alkaline metal compound, an alkaline-earth metal compound, and a nitrogen-containing compound.

Examples of the alkaline metal compound include the organic acid salt, inorganic acid salt, oxide, hydroxide, hydride, or alkoxide of alkaline metals. Specific examples of the alkaline metal compound used herein include sodium hydroxide, potassium hydroxide, cesium hydroxide, lithium hydroxide, sodium hydrogen carbonate, sodium carbonate, potassium carbonate, cesium carbonate, lithium carbonate, sodium acetate, potassium acetate, cesium acetate, lithium acetate, sodium stearate, potassium stearate, cesium stearate, lithium stearate, sodium borohydride, sodium borophenylate, sodium benzoate, potassium benzoate, cesium benzoate, lithium benzoate, disodium hydrogen phosphate, dipotassium hydrogen phosphate, dilithium hydrogen phosphate, disodium phenyl phosphate, the disodium salt, dipotassium salt, dicesium salt or dilithium salt of bisphenol A, and the sodium salt, potassium salt, cesium salt or lithium salt of phenol.

Examples of the alkaline-earth metal compound include the organic acid salt, inorganic acid salt, oxide, hydroxide, hydride, or alkoxide of an alkaline-earth metal compound. Specific examples of the alkaline-earth metal compound used herein include magnesium hydroxide, calcium hydroxide, strontium hydroxide, barium hydroxide, magnesium hydrogen carbonate, calcium hydrogen carbonate, strontium hydrogen carbonate, barium hydrogen carbonate, magnesium carbonate, calcium carbonate, strontium carbonate, barium carbonate, magnesium acetate, calcium acetate, strontium acetate, barium acetate, magnesium stearate, calcium stearate, calcium benzoate, and magnesium phenyl phosphate.

Examples of the nitrogen-containing compound include quaternary ammonium hydroxide and a salt thereof, and amines. Specific examples of the nitrogen-containing compound used herein include: quaternary ammonium hydroxides having an alkyl group, an aryl group, etc., such as tetramethylammonium hydroxide, tetraethylammonium hydroxide, tetrapropylammonium hydroxide, tetrabutylammonium hydroxide, or trimethylbenzylammonium hydroxide; tertiary amines, such as triethylamine, dimethylbenzylamine, or triphenylamine; secondary amines, such as diethylamine or dibutylamine; primary amines, such as propylamine or butylamine; imidazoles, such as 2-methylimidazole, 2-phenylimidazole, or benzimidazole; and bases or basic salts, such as ammonia, tetramethylammonium borohydride, tetrabutylammonium borohydride, tetrabutylammonium tetraphenylborate, or tetraphenylammonium tetraphenylborate.

As other transesterification catalysts, the salts of zinc, tin, zirconium, lead, etc. may also be used. These salts can be used alone or in combination.

Specific examples of other transesterification catalysts include zinc acetate, zinc benzoate, zinc 2-ethylhexanoate, tin(II) chloride, tin(IV) chloride, tin(II) acetate, tin(IV) acetate, dibutyltin laurate, dibutyltin oxide, dibutyltin dimethoxide, zirconium acetylacetonate, zirconium oxyacetate, zirconium tetrabutoxide, lead(II) acetate, and lead(IV) acetate.

The transesterification catalyst is used at a ratio of $1\times10^{-9}$ to $\times10^{-3}$ moles, and preferably $1\times10^{-7}$ to $1\times10^{-4}$ moles, based on total 1 mole of the dihydroxy compound.

<Ultraviolet Absorber>

Examples of the ultraviolet absorber include a benzotriazole-based ultraviolet absorber, a triazine-based ultraviolet absorber, a benzophenone-based ultraviolet absorber, a cyclic imino ester-based ultraviolet absorber, and a cyanoacrylate-based ultraviolet absorber. The ultraviolet absorber may be used alone, or may also be used in combination of two or more types.

In the present description, the ultraviolet absorber means an ultraviolet absorber having an absorption band in the range of, at least, 340 to 420 nm, when it is measured in a chloroform solution. The phrase "having an absorption band in the range of, at least, 340 to 420 nm" means that the absorbance measured using a spectrophotometer (calculated from the intensity of the transmitted light to the incident light) is present in the range of the absorption band.

By allowing the resin composition to comprise such an ultraviolet absorber, ultraviolet-absorbing ability can be imparted to the resin composition.

Examples of the benzotriazole-based ultraviolet absorber include 2-(2-hydroxy-5-methylphenyl)benzotriazole, 2-(2-hydroxy-5-tert-octylphenyl)benzotriazole, 2-(2-hydroxy-3,5-dicumylphenyl)phenylbenzotriazole, 2-(2-hydroxy-3-tert-butyl-5-methylphenyl)-5-chlorobenzotriazole, 2,2'-methylenebis[4-(1,1,3,3-tetramethylbutyl)-6-(2H-benzotriazol-2-yl)phenol] (ADK STAB LA-31, manufactured by ADEKA), 2-(2-hydroxy-3,5-di-tert-butylphenyl)benzotriazole, 2-(2-hydroxy-3,5-di-tert-butylphenyl)-5-chlorobenzotriazole, 2-(2-hydroxy-3,5-di-tert-amylphenyl)benzotriazole, 2-(2-hydroxy-5-tert-octylphenyl)benzotriazole, 2-(2-hydroxy-5-tert-butylphenyl)benzotriazole, 2-(2-hydroxy-4-octoxyphenyl)benzotriazole, 2,2'-methylenebis(4-cumyl-6-benzotriazolephenyl), 2,2'-p-phenylenebis(1,3-benzoxazin-4-one), and 2-[2-hydroxy-3-(3,4,5,6-tetrahydrophthalimidemethyl)-5-methylphenyl]benzotriazole.

Examples of the benzophenone-based ultraviolet absorber include 2,4-dihydroxybenzophenone, 2-hydroxy-4-methoxybenzophenone, 2-hydroxy-4-octoxybenzophenone, 2-hydroxy-4-benzyloxybenzophenone, 2-hydroxy-4-methoxy-5-sulfoxybenzophenone, 2-hydroxy-4-methoxy-5-sulfoxytrihydridatebenzophenone, 2,2'-dihydroxy-4-methoxybenzophenone, 2,2',4,4'-tetrahydroxybenzophenone, 2,2'-dihydroxy-4,4'-dimethoxybenzophenone, 2,2'-dihydroxy-4,4'-dimethoxy-5-sodium sulfoxybenzophenone, bis(5-benzoyl-4-hydroxy-2-methoxyphenyl)methane, 2-hydroxy-4-n- dodecyloxybenzophenone, 2-hydroxy-4-methoxy-2'-carboxybenzophenone, and [2-hydroxy-4-(octyloxy)phenyl](phenyl)methanone (ADK STAB 1413, manufactured by ADEKA).

Examples of the triazine-based ultraviolet absorber include 2-(4,6-diphenyl-1,3,5-triazin-2-yl)-5-[(hexyl)oxy]-phenol, 2-(4,6-bis(2,4-dimethylphenyl)-1,3,5-triazin-2-yl)-5-[(octyl)oxy]-phenol, and 2,4,6-tris(2-hydroxy-4-hexyloxy-3-methylphenyl)-1,3,5-triazine (ADK STAB LA-F70, manufactured by ADEKA).

Examples of the cyclic imino ester-based ultraviolet absorber include 2,2'-bis(3,1-benzoxazin-4-one), 2,2'-p-phenylenebis(3,1-benzoxazin-4-one), 2,2'-m-phenylenebis(3,1-benzoxazin-4-one), 2,2'-(4,4'-diphenylene)bis(3,1-benzoxazin-4-one), 2,2'-(2,6-naphthalene)bis(3,1-benzoxazin-4-one), 2,2'-(1,5-naphthalene)bis(3,1-benzoxazin-4-one), 2,2'-(2-methyl-p-phenylene)bis(3,1-benzoxazin-4-one), 2,2'-(2-nitro-p-phenylene)bis(3,1-benzoxazin-4-one), and 2,2'-(2-chloro-p-phenylene)bis(3,1-benzoxazin-4-one).

An example of the cyanoacrylate-based ultraviolet absorber is 1,3-bis-[(2'-cyano-3',3'-diphenylacryloyl)oxy]-2,2-bis[(2-cyano-3,3-diphenylacryloyl)oxy]methyl)propane.

From the viewpoint of further improving ultraviolet-absorbing ability and retaining the bending and Izod strength originally possessed by the resin, among the aforementioned ultraviolet absorbers, at least one selected from the group consisting of benzotriazole-based, triazine-based, and benzophenone-based ultraviolet absorbers is preferable, and among others, benzotriazole-based ultraviolet absorbers are more preferable. Among such benzotriazole-based ultraviolet absorbers, 2,2'-methylenebis[4-(1,1,3,3-tetramethylbutyl)-6-(2H-benzotriazol-2-yl)phenol] is further preferable.

The ultraviolet absorber is added in an amount of 2,000 ppm to 40,000 ppm, based on 100 parts by mass of the resin composition as a whole. When the ultraviolet absorber is added in an amount of 2000 ppm or more to the resin composition, good absorbing ability is exhibited to light with a wavelength of 420 nm or less. On the other hand, when the ultraviolet absorber is added in an amount of 40,000 ppm or less, high impact resistance can be retained. In order to achieve both high ultraviolet-absorbing ability and high bending strength, the amount of the ultraviolet absorber added is preferably 3,000 to 30,000 ppm, more preferably 7,000 to 30,000 ppm, and further preferably 10,000 to 20,000 ppm.

After completion of the polymerization reaction of the thermoplastic resin, the ultraviolet absorber may be directly added to the reaction tank. Otherwise, after completion of the reaction, the ultraviolet absorber may be melted and kneaded using a commercially available extruder or the like. For such melting and kneading, a commonly used uniaxial or biaxial extruder, and a kneading device such as various types of kneaders, can be used. In particular, a biaxial high-kneading machine is preferable. Upon such melting and kneading, the cylinder temperature of a kneading device is in the range of preferably 200° C. to 340° C., and more preferably 250° C. to 320° C. If the temperature of the cylinder is higher than 340° C., the thermoplastic resin is decomposed, and coloration and molding deficiency caused by decomposed products unfavorably increase. On the other hand, if the cylinder temperature is lower than 200° C., there may be a case where the viscosity of the thermoplastic resin becomes high and the ultraviolet absorber cannot be uniformly dispersed therein. Otherwise, such melting and kneading may also be carried out in a vacuum state. By performing such melting and kneading operations in a vacuum state, low-molecular-weight substances such as the remaining PhOH of the thermoplastic resin are decreased, and as a result, molding deficiency can be favorably reduced. The degree of vacuum is a pressure of preferably 13.3 kPa or less, and more preferably 5 kPa or less.

Upon kneading, individual components may have been uniformly mixed in advance, using a device such as a tumbler or a Henschel mixer. Otherwise, if necessary, such mixing is omitted, and a method of quantitatively supplying individual components, separately, to the kneading device can also be applied. At the same time as addition of various types of additives such as a catalyst deactivator, such individual components may be added or kneaded.

<Other Components>

The resin composition may comprise additives such as an antioxidant, a processing stabilizer, a light stabilizer, a polymerization metal inactivating agent, a fire retardant, a lubricant, an antistatic agent, a surfactant, an antibacterial agent, a release agent, an ultraviolet absorber, a plasticizer, and a compatibilizer, in the range in which they do not impair the characteristics of the present invention. Among others, it is preferable that the resin composition further comprise an antioxidant and/or a release agent.

Examples of the antioxidant include triethylene glycol-bis[3-(3-tert-butyl-5-methyl-4-hydroxyphenyl)propionate], 1,6-hexanediol-bis[3-(3,5-di-tert-butyl-4-hydroxyphenyl)propionate], pentaerythritol-tetrakis [3-(3,5-di-tert-butyl-4-hydroxyphenyl)propionate], octadecyl-3-(3,5-di-tert-butyl-4-hydroxyphenyl)propionate 1,3,5-trimethyl-2,4,6-tris(3,5-di-tert-butyl-4-hydroxybenzyl)benzene, N,N-hexamethylenebis(3,5-di-tert-butyl-4-hydroxyhydrocinnamide), 3,5-di-tert-butyl-4-hydroxybenzylphosphonate-diethyl ester, tris(3,5-di-tert-butyl-4-hydroxybenzyl)isocyanurate, and 3,9-bis {1,1-dimethyl-2-[3-(3-tert-butyl-4-hydroxy-5-methylphenyl)propionyloxy]ethyl}-2,4,8,10-tetraoxaspiro(5,5)undecane. The content of the antioxidant in the resin composition is preferably 0.001 to 0.3 parts by weight based on 100 parts by weight of the thermoplastic resin.

Examples of the processing stabilizer include a phosphorus-based processing heat stabilizer and a sulfur-based processing heat stabilizer. Examples of the phosphorus-based processing heat stabilizer include phosphorous acid, phosphoric acid, phosphonous acid, phosphonic acid, and esters thereof. Specific examples include triphenyl phosphite, tris(nonylphenyl) phosphite, tris(2,4-di-tert-butylphenyl) phosphite, tris(2,6-di-tert-butylphenyl) phosphite, tridecyl phosphite, trioctyl phosphite, trioctadecyl phosphite, didecylmonophenyl phosphite, dioctylmonophenyl phosphite, diisopropylmonophenyl phosphite, monobutyldiphenyl phosphite, monodecyldiphenyl phosphite, monooctyldiphenyl phosphite, bis(2,6-di-tert-butyl-4-methylphenyl) pentaerythritol diphosphite, 2,2-methylenebis(4,6-di-tert-butylphenyl)octyl phosphite, bis(nonylphenyl) pentaerythritol diphosphite, bis(2,4-dicumylphenyl) pentaerythritol diphosphite, bis(2,4-di-tert-butylphenyl) pentaerythritol diphosphite, distearylpentaerythritol diphosphite, tributyl phosphate, triethyl phosphate, trimethyl phosphate, triphenyl phosphate, diphenylmonoorthoxenyl phosphate, dibutyl phosphate, dioctyl phosphate, diisopropyl phosphate, dimethyl benzenephosphonate, diethyl benzenephosphonate, dipropyl benzenephosphonate, tetrakis(2,4-di-tert-butylphenyl)-4,4'-biphenylene diphosphonite, tetrakis(2,4-di-tert-butylphenyl)-4,3'-biphenylene diphosphonite, tetrakis(2,4-di-tert-butylphenyl)-3,3'-biphenylene diphosphonite, bis(2,4-di-tert-butylphenyl)-4-phenyl-phenyl phosphonite, and bis(2,4-di-tert-butylphenyl)-3-phenyl-phenyl phosphonite. The content of the phosphorus-based processing heat stabilizer in the resin composition is preferably 0.001 to 0.2 parts by weight based on 100 parts by weight of the thermoplastic resin.

Examples of the sulfur-based processing heat stabilizer include pentaerythritol-tetrakis(3-laurylthiopropionate), pentaerythritol-tetrakis(3-myristylthiopropionate), pentaerythritol-tetrakis(3-stearylthiopropionate), dilauryl-3,3'-thiodipropionate, dimyristyl-3,3'-thiodipropionate, and distearyl-3,3'-thiodipropionate. The content of the sulfur-based processing heat stabilizer in the resin composition is preferably 0.001 to 0.2 parts by weight based on 100 parts by weight of the thermoplastic resin.

A preferred release agent is a release agent, 90% by weight or more of which consists of esters of alcohol and fatty acid. Specific examples of such esters of alcohol and fatty acid include esters of monohydric alcohol and fatty acid, and partial esters or total esters of polyhydric alcohol and fatty acid. The above-described esters of monohydric alcohol and fatty acid are preferably esters of monohydric alcohol containing 1 to 20 carbon atoms and saturated fatty acid containing 10 to 30 carbon atoms. Moreover, the above-described partial esters or total esters of polyhydric alcohol and fatty acid are preferably partial esters or total esters of polyhydric alcohol containing 1 to 25 carbon atoms and saturated fatty acid containing 10 to 30 carbon atoms.

Specific examples of the esters of monohydric alcohol and saturated fatty acid include stearyl stearate, palmityl palmitate, butyl stearate, methyl laurate, and isopropyl palmitate. Specific examples of the partial esters or total esters of polyhydric alcohol and saturated fatty acid include total esters or partial esters of dipentaerythritol, such as monoglyceride stearate, diglyceride stearate, triglyceride stearate, monosorbitate stearate, monoglyceride behenate, monoglyceride caprate, monoglyceride laurate, pentaerythritol monostearate, pentaerythritol tetrastearate, pentaerythritol tetrapelargonate, propylene glycol monostearate, biphenyl biphenate, sorbitan monostearate, 2-ethylhexyl stearate, or dipentaerythritol hexastearate. Among these compounds, monoglyceride stearate and monoglyceride laurate are particularly preferable. The content of such a release agent is preferably in the range of 0.005 to 2.0 parts by weight, more preferably in the range of 0.01 to 0.6 parts by weight, and further preferably in the range of 0.02 to 0.5 parts by weight, based on 100 parts by weight of the thermoplastic resin.

The resin composition according the embodiment may comprise other resins, as well as the aforementioned thermoplastic resin, in the range in which they do not impair the characteristics of the present invention.

Examples of other resins, which may be comprised in the resin composition, include the following:

polyethylene, polypropylene, polyvinyl chloride, polystyrene, a (meth)acrylic resin, an ABS resin, polyamide, polyacetal, polycarbonate (provided that it does not comprise the constituting unit (A)), polyphenylene ether, polyester (provided that it does not comprise the constituting unit (A)), polyester carbonate (provided that it does not comprise the constituting unit (A)), polyphenylene sulfide, polyimide, polyether sulfone, polyether ether ketone, a fluorine resin, a cycloolefin polymer, an ethylene-vinyl acetate copolymer, an epoxy resin, a silicone resin, a phenolic resin, an unsaturated polyester resin, and polyurethane.

The content of other resins, which may be comprised in the resin composition, is preferably 20 parts by mass or less, and more preferably 10 parts by mass or less, based on the total mass of the thermoplastic resin comprising the constituting unit (A). If the content of other resins is too high, there may be a case where compatibility is deteriorated and the transparency of the resin composition is reduced.

In the resin composition, phenol generated upon the production of individual resins constituting the composition or unreacted remaining carbonic acid diester is present as an impurity. The content of such phenol in the resin composition is preferably 0.1 to 3000 ppm, more preferably 0.1 to 2000 ppm, and particularly preferably 1 to 1000 ppm, 1 to 800 ppm, 1 to 500 ppm, or 1 to 300 ppm. In addition, the content of such carbonic acid diester in the resin composition is preferably 0.1 to 1000 ppm, more preferably 0.1 to 500 ppm, and particularly preferably 1 to 100 ppm.

If the content of phenol or carbonic acid diester is higher than the above-described range, problems may occur, such as a reduction in the strength of the obtained resin molded body or generation of odor. On the other hand, if the content of phenol or carbonic acid diester is lower than the above-described range, it is likely that plasticity is reduced upon the melting of the resin.

(Physical Properties of Resin Composition)

In the resin composition of the present invention (or a molded body produced from the resin composition), the light transmittance at a wavelength of 410 nm is preferably 50% or less, more preferably 20% or less, and further preferably 10% or less.

Moreover, the light transmittance at a wavelength of 420 nm is preferably 60% or less, and more preferably 50% or less. The light transmittance is measured using a spectrophotometer.

In the resin composition of the present invention, the bending strength measured in accordance with ISO 178 is preferably 2,000 MPa or more, and more preferably 2500 MPa or more. The preferred upper limit of the bending strength is not particularly limited, and it is 5 MPa or less.

In the resin composition of the present invention, the Izod impact strength is preferably 2 $J/m^2$ or more, and more preferably 3 $J/m^2$ or more. The Izod impact strength is measured in accordance with JIS-K7110 (notched).

<Molded Body>

Using the resin composition of the present invention, a molded body can be produced. The present resin composition is molded into a molded body according to any given method, for example, by an injection molding method, a compression molding method, an extrusion molding method, or a solution casting method. Since the resin composition according to the embodiment is excellent in moldability and heat resistance, it can be used particularly advantageously in optical lenses and optical films, which need injection molding. In the resin composition according to the embodiment, an ultraviolet absorber is mixed into the resin itself, and thus, it is not necessary to establish a separate layer or member (an ultraviolet cutting layer, an ultraviolet cutting filter, etc.). Accordingly, the present resin composition is preferable for mass production, and further, high ultraviolet-absorbing ability and the sufficient bending strength properties of a molded body can be achieved.

(Optical Lens)

The optical lens produced using the thermoplastic resin according to the embodiment has a high refractive index and is excellent in heat resistance. Hence, the optical lens can be used in the field in which expensive glass lenses with a high refractive index have conventionally been used, such as a telescope, binoculars and a television projector, and thus, it is extremely useful. The optical lens is preferably used in the form of an aspherical lens, as necessary. Since a single aspherical lens is able to set the spherical aberration to be substantially zero, it is not necessary to remove the spherical aberration by a combination of multiple spherical lenses, and thus, it enables weight saving and a reduction in production costs. Accordingly, such an aspherical lens is particularly useful as a camera lens, among optical lenses.

When the optical lens of the present invention is produced by injection molding, molding is preferably carried out under conditions of a cylinder temperature of 230° C. to 270° C. and a metallic mold temperature of 100° C. to 140° C. According to such molding conditions, an optical lens having excellent physical properties and also having the function of cutting the wavelength of an ultraviolet region can be obtained. Thus, when the produced optical lens is used as a lens for digital cameras, the influence of ultraviolet ray on an image sensor can be prevented without using an ultraviolet filter. In contrast, when the resin composition of the present invention is used as an ultraviolet filter, since it has extremely high transparency, the image quality of the taken photographs is not deteriorated, and clear photographs can be taken.

Moreover, since the resin of the embodiment has high fluidity, it can be a thin and small optical lens having a complicated shape. With regard to the specific size of the lens, the thickness of the central portion is 0.05 to 3.0 mm, more preferably 0.05 to 2.0 mm, and further preferably 0.1 to 2.0 mm. In addition, the diameter is 1.0 mm to 20.0 mm, more preferably 1.0 to 10.0 mm, and further preferably 3.0 to 10.0 mm.

On the surface of the optical lens of the present invention, a coating layer such as an anti-reflection layer or a hard coat layer may be established, as necessary. The anti-reflection layer may be a single layer or multiple layers. It may also be an organic matter or an inorganic matter, but it is preferably an inorganic matter. Specific examples include oxides or fluorides, such as silicon oxide, aluminum oxide, zirconium oxide, titanium oxide, cerium oxide, magnesium oxide or magnesium fluoride. Moreover, the optical lens of the present invention may also be molded by any given method such as metal molding, cutting, polishing, laser processing, electrical discharge machining, or edging. Among these methods, metal molding is more preferable.

(Optical Film)

Since the resin composition of the present invention has a low birefringence value and is excellent in transparency, it can be preferably used also as an optical film or sheet. Such a film or sheet can be molded and produced by a method such as a casting method, a melt pressing method or an extrusion film formation method.

It is to be noted that the "sheet" generally means a thin and flat product, the thickness of which is relatively small, in consideration of the length and width thereof, and that the "film" is a thin and flat product, the thickness of which is extremely small, in consideration of the length and width thereof, wherein the highest thickness is arbitrarily limited, and it is generally supplied in the form of a roll. In the present description, however, the "sheet" is not clearly distinguished from the "film," and they are both used to have the same meaning.

Molded products produced by these methods are used for various types of glazing uses, lenses for automobile lamps, lamp covers, optical lenses, OHP sheets, nameplates, display lights, etc. In addition, the films produced by such methods are preferably used as Placell substrates or phase difference films for the intended use of flat panel display substrates. For such Placell substrates, the films are used without being stretched. However, for the use as phase difference films, the films are subjected to stretch orientation, at least, in the uniaxial direction, so that the phase difference films can have optimal birefringence characteristics.

A film formed from the resin composition of the present invention has good heat resistance and hue. For example, the resin composition is dissolved in an organic solvent such as methylene chloride, tetrahydrofuran or dioxane, and is then molded into a casting film. Thereafter, a gas barrier film or a solvent-resistant film is applied to both sides of this film. Otherwise, together with a transparent conductive film or a polarizing plate, the film is preferably used as a film for liquid crystal substrates (Placell substrate), or as a liquid crystal display film such as a phase difference film. Specifically, the film can be advantageously used for various display devices such as a tablet, a smart phone or a handy terminal.

EXAMPLES

Hereinafter, the present invention will be more specifically described in the following examples. However, these examples are not intended to limit the scope of the present invention. It is to be noted that the measurement values in the following examples were measured by applying the following methods or devices.

1) Polystyrene-Relative Weight Average Molecular Weight (Mw):

Tetrahydrofuran was used as a developing solvent, and a calibration curve was produced according to gel permeation chromatography (GPC), using standard polystyrene having a known molecular weight (molecular weight distribution: 1). Based on the produced calibration curve, Mw was calculated from the retention time in GPC.

2) Light Transmittance:

A polycarbonate resin composition was molded into a disk-shaped test piece (thickness: 3 mm, diameter: 50 mm), using FUNUC ROBOSHOTS-2000i30A manufactured by FANUC CORPORATION, at a molding temperature of 260° C., and at a metallic mold temperature of 120° C. to 130° C. The light transmittance of the obtained molded body at a wavelength of 410 nm to 420 nm was measured using Hitachi Spectrophotometer U-4100 manufactured by Hitachi High-Tech Science Corporation.

3) Izod Impact Strength:

The Izod impact strength of a polycarbonate resin composition was measured in accordance with JIS-K 7110 (notched).

4) Bending Strength:

The bending strength of a polycarbonate resin composition was measured in accordance with ISO 178.

Production Example 1; Production of Polycarbonate Resin PC1

15.401 kg of 9,9-bis(4-(2-hydroxyethoxy)phenyl)fluorene represented by the following formula (1)' (35.12 moles) (hereinafter also abbreviated as "BPEF"), 1.198 kg of bisphenol A represented by the following formula (3)' (5.25 moles) (hereinafter also abbreviated as "Bis-A"), 9.0974 kg of diphenyl carbonate (42.47 moles) (hereinafter also abbreviated as "DPC"), and 0.02034 g of sodium hydrogen carbonate ($2.4221 \times 10^{-4}$ moles) were added into a 50-L reactor equipped with a stirrer and a distillation apparatus. Thereafter, the reactor was heated to 215° C. under 760 Torr in a nitrogen atmosphere over 1 hour, and the mixture was stirred. Thereafter, the degree of vacuum was adjusted to 150 Torr over 15 minutes, and the reaction mixture was then retained at 215° C. under 150 Torr for 20 minutes, so as to carry out a transesterification reaction. The temperature was increased to 240° C. at a rate of 37.5° C./hr, and the reaction mixture was then retained at 340° C. under 150 Torr for 10 minutes. Thereafter, the degree of vacuum was adjusted to 120 Torr over 10 minutes, and the reaction mixture was then retained at 240° C. under 120 Torr for 70 minutes. After that, the degree of vacuum was adjusted to 100 Torr over 10 minutes, and the reaction mixture was then retained at 240° C. under 100 Torr for 10 minutes. Thereafter, the degree of vacuum was further adjusted to 1 Torr or less over 40 minutes, and a polymerization reaction was then carried out at 240° C. under 1 Torr or less for 10 minutes, while stirring. After completion of the reaction, the inside of the reactor was pressurized by blowing nitrogen into the reactor, and the generated polycarbonate resin was then taken out, while pelletizing it.

(hereinafter also abbreviated as "BHEBN"), 13.99 kg of BPEF (31.90 moles), 12.19 kg of DPC (56.91 mole), and 0.0277 g of sodium hydrogen carbonate ($3.302 \times 10^{-4}$ moles) were added into a 50-L reactor equipped with a stirrer and a distillation apparatus. Thereafter, the reactor was heated to 180° C. in a nitrogen atmosphere under 760 Torr over 2 hours 20 minutes, so that the substances were melted. Thereafter, the degree of vacuum was adjusted to 205 Torr over 20 minutes. After that, the temperature was increased to 240° C. at a rate of 20.0° C./hr, and the reaction mixture was then retained at the temperature for 10 minutes. Thereafter, the degree of vacuum was decreased to 10 Torr or less over 80 minutes. Thereafter, a polymerization reaction was carried out at 240° C. under 10 Torr or less for 20 minutes, while stirring.

After completion of the reaction, the inside of the reactor was pressurized by blowing nitrogen into the reactor, and the generated polycarbonate resin was then taken out, while pelletizing it.

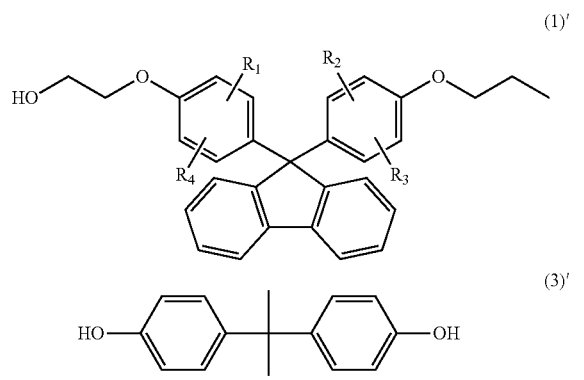

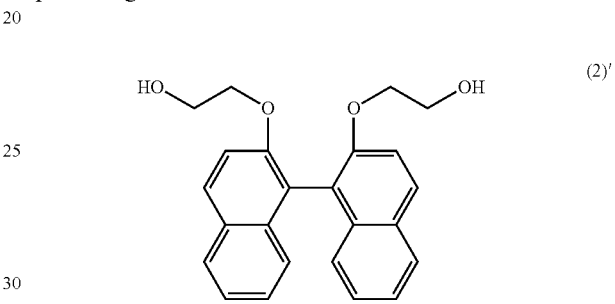

Production Example 2; Production of Polycarbonate Resin PC2

21.985 kg of BPEF (50.14 moles), 11.20 kg of DPC (52.28 moles), and 0.02526 g of sodium hydrogen carbonate ($3.0082 \times 10^{-4}$ moles) were added into a 50-L reactor equipped with a stirrer and a distillation apparatus. Thereafter, the reactor was heated to 215° C. under 760 Torr in a nitrogen atmosphere over 1 hour, and the mixture was stirred. Thereafter, the degree of vacuum was adjusted to 150 Torr over 15 minutes, and the reaction mixture was then retained at 215° C. under 150 Torr for 20 minutes, so as to carry out a transesterification reaction. The temperature was increased to 240° C. at a rate of 37.5° C./hr, and the reaction mixture was then retained at 340° C. under 150 Torr for 10 minutes. Thereafter, the degree of vacuum was adjusted to 120 Torr over 10 minutes, and the reaction mixture was then retained at 240° C. under 120 Torr for 70 minutes. After that, the degree of vacuum was adjusted to 100 Torr over 10 minutes, and the reaction mixture was then retained at 240° C. under 100 Torr for 10 minutes. Thereafter, the degree of vacuum was further adjusted to 1 Torr or less over 40 minutes, and a polymerization reaction was then carried out at 240° C. under 1 Torr or less for 10 minutes, while stirring. After completion of the reaction, the inside of the reactor was pressurized by blowing nitrogen into the reactor, and the generated polycarbonate resin was then taken out, while pelletizing it.

Production Example 3; Production of Polycarbonate Resin PC3

8.66 kg of 2,2'-bis(2-hydroxyethoxy)-1,1'-binaphthalene represented by the following formula (2)' (23.13 moles)

Production Example 4; Production of Polycarbonate Resin PC4

The same operations as those of Example 1 were carried out, with the exceptions that the amount of BHEBN was set at 6.126 kg (16.36 moles), BPEF was changed to 11.80 kg of 9,9-bis(4-(2-hydroxyethoxy)-3-phenylphenyl)fluorene represented by the following formula (1)" (19.98 moles) (hereinafter also abbreviated as "BEPPF"), the amount of DPC was set at 7.89 kg (36.83 moles), and the amount of sodium hydrogen carbonate was set at 0.01831 g ($2.1805 \times 10^{-4}$ moles). The generated polycarbonate resin was taken out.

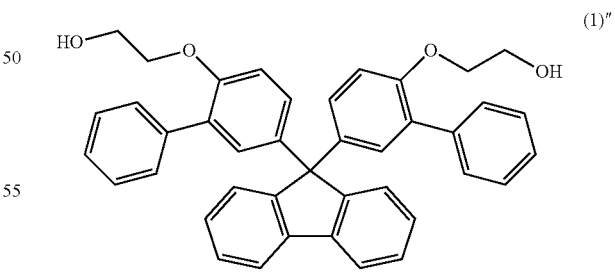

Example 1

With respect to 100 parts by weight of the polycarbonate resin (PC1) synthesized in the above-described Production Example 1, 0.7 parts by weight (7000 ppm) of 2,2'-methylenebis[4-(1,1,3,3-tetramethylbutyl)-6-(2H-benzotriazol-2-yl)phenol] (ADK STAB LA-31, manufactured by ADEKA)

serving as an ultraviolet absorber, and 0.1 part by weight (10×00 ppm) of pentaerythritol tetrakis[3-(3,5-di-tert-butyl-4-hydroxyphenyl)propionate](ADK STAB AO-60, manufactured by ADEKA) serving as an antioxidant were compounded, using a vent type twin-screw extruder (IPEC, manufactured by Niigata Engineering Co., Ltd. (completely intermeshing, unidirectionally rotating type)), so as to obtain pellets of a polycarbonate resin composition. Extrusion conditions consisted of a discharged amount of 10 kg/h, a screw rotation number of 150 rpm, and a vacuum degree of vent of 3 kPa. In addition, the extrusion temperature was set at 260° C. from a first supplying port to a die portion. The weight average molecular weight of the obtained resin composition was found to be 30,500.

Examples 2 to 15

Each polycarbonate resin composition was obtained in the same manner as that of Example 1, with the exception that the type and additive amount of a polycarbonate resin and an ultraviolet absorber were changed.

From Table 1, it is confirmed that, in the case of resin compositions each comprising a polycarbonate resin comprising the constituting unit (A) derived from the compound represented by the general formula (1), and an ultraviolet absorber in an amount of 2,000 ppm to 40,000 ppm, the light transmittance of ultraviolet ray (410 nm or 420 nm) was reduced to 50% or less, the bending strength was high (2700 MPa or more), and impact resistance was also excellent. In contrast, in the case of the resin composition of Comparative Example 1, comprising an ultraviolet absorber in an amount of less than 2.000 ppm, and the resin composition of Comparative Example 3, comprising no ultraviolet absorbers, the light transmittance of ultraviolet ray was high. Moreover, in the case of the resin composition of Comparative Example 2, comprising an ultraviolet absorber in an amount of more than 40,000 ppm, although the light transmittance of ultraviolet ray was low, the bending strength was significantly reduced, and the impact resistance was insufficient.

TABLE 1

|  | Ex. 1 | Ex. 2 | Ex. 3 | Ex. 4 | Ex. 5 | Ex. 6 | Ex. 7 | Ex. 8 | Ex. 9 |
|---|---|---|---|---|---|---|---|---|---|
| Measured wavelength | 410 nm | 410 nm | 410 nm | 410 nm | 410 nm | 410 nm | 410 nm | 410 nm | 410 nm |
| Polycarbonate resin | PC1 | PC1 | PC2 | PC2 | PC2 | PC2 | PC2 | PC3 | PC3 |
| Ultraviolet absorber | a | a | a | a | a | a | a | a | a |
| Additive amount of ultraviolet absorber | 7000 | 20000 | 3000 | 7000 | 10000 | 20000 | 30000 | 7000 | 20000 |
| Weight average molecular weight (Mw) | 30500 | 29800 | 30200 | 29800 | 29500 | 28000 | 26600 | 44500 | 43300 |
| Light transmittance (%) | 17 | 3 | 20 | 15 | 5 | 2 | 0 | 14 | 1 |
| Bending strength (MPa) | 2900 | 2880 | 2960 | 2940 | 2900 | 2800 | 2760 | 2900 | 2850 |
| Izod impact strength (J/m$^2$) | 3 | 3 | 3 | 3 | 3 | 3 | 3 | 3 | 3 |

|  | Ex. 10 | Ex. 11 | Ex. 12 | Ex. 13 | Ex. 14 | Ex. 15 | Comp. Ex. 1 | Comp. Ex. 2 | Comp. Ex. 3 |
|---|---|---|---|---|---|---|---|---|---|
| Measured wavelength | 410 nm | 410 nm | 420 nm | 420 nm | 420 nm | 420 nm | 410 nm | 410 nm | 410 nm |
| Polycarbonate resin | PC4 | PC4 | PC1 | PC1 | PC2 | PC2 | PC2 | PC2 | PC2 |
| Ultraviolet adsorber | a | a | a | b | a | b | a | a | a |
| Additive amount of ultraviolet absorber | 7000 | 20000 | 7000 | 7000 | 7000 | 7000 | 1000 | 50000 | — |
| Weight average molecular weight (Mw) | 61000 | 60200 | 30500 | 30000 | 29800 | 29700 |  | 25000 | 30200 |
| Light transmittance (%) | 12 | 1 | 50 | 47 | 48 | 25 | 65 | 0 | 89 |
| Bending strength (MPa) | 2950 | 2910 | 2900 | 2800 | 2940 | 2800 | 2970 | 1800 | 2980 |
| Izod impact strength (J/m$^2$) | 3 | 3 | 3 | 3 | 3 | 3 | 3 | 1 | 3 |

Comparative Examples 1 and 2

Each polycarbonate resin composition was obtained in the same manner as that of Example 1, with the exceptions that PC2 was used, and that the amount of the ultraviolet absorber was changed to 1,000 ppm (Comparative Example 1) or 50,000 ppm (Comparative Example 2).

Comparative Example 3

A polycarbonate resin composition was obtained in the same manner as that of Example 1, with the exceptions that PC2 was used, and that an ultraviolet absorber was not added.

Ultraviolet absorber a: 2,2'-methylenebis[4-(1,1,3,3-tetramethylbutyl)-6-(2H-benzotriazol-2-yl)phenol] (ADK STAB LA-31, manufactured by ADEKA)

Ultraviolet absorber b: 2,4,6-tris(2-hydroxy-4-hexyloxy-3-methylphenyl)-1,3,5-triazine (ADK STAB LA-F70, manufactured by ADEKA)

INDUSTRIAL APPLICABILITY

Since the resin composition of the present invention has high ultraviolet absorbency and high bending strength, it is useful as an optical material such as an optical film or an optical lens.

The invention claimed is:

1. A resin composition comprising a thermoplastic resin comprising a constituting unit (A) derived from a compound represented by the following formula (1), wherein the resin composition comprises a benzotriazole-based ultraviolet absorber in an amount of 10,000 ppm to 20,000 ppm,

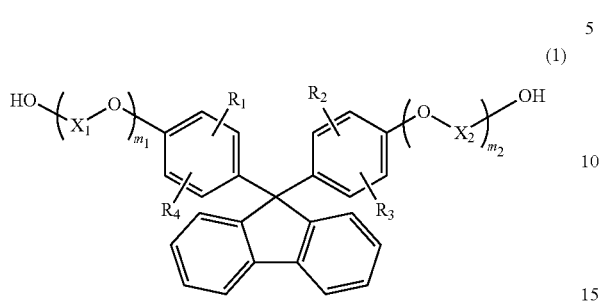

(1)

wherein $R_1$ to $R_4$ is each independently selected from the group consisting of a hydrogen atom, an alkyl group containing 1 to 20 carbon atoms, an alkoxyl group containing 1 to 20 carbon atoms, a cycloalkyl group containing 5 to 20 carbon atoms, a cycloalkoxyl group containing 5 to 20 carbon atoms, an aryl group containing 6 to 20 carbon atoms, and an aryloxy group containing 6 to 20 carbon atoms;

$X_1$ and $X_2$ is each independently selected from the group consisting of an alkylene group containing 2 to 8 carbon atoms, a cycloalkylene group containing 5 to 12 carbon atoms, and an arylene group containing 6 to 20 carbon atoms; and $m_1$ and $m_2$ each independently represents an integer of 1 to 5.

2. The resin composition according to claim 1, wherein the thermoplastic resin further comprises at least one constituting unit selected from the group consisting of a constituting unit (B) derived from a compound represented by the following formula (2) and a constituting unit (C) derived from a compound represented by the following formula (3),

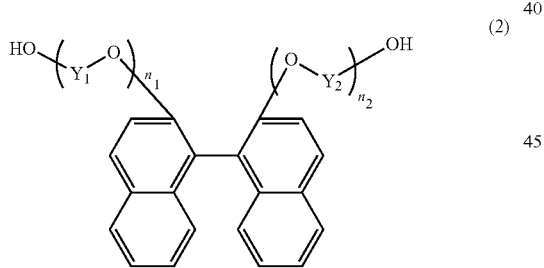

(2)

wherein $Y_1$ and $Y_2$ each independently represents an alkylene group containing 1 to 8 carbon atoms; and $n_1$ and $n_2$ each independently represents an integer of 1 to 5, and

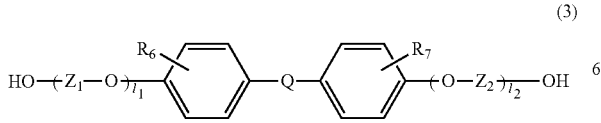

(3)

wherein $R_6$ and $R_7$ is each independently selected from the group consisting of a hydrogen atom, an alkyl group containing 1 to 20 carbon atoms, an alkoxyl group containing 1 to 20 carbon atoms, a cycloalkyl group containing 5 to 20 carbon atoms, a cycloalkoxyl group containing 5 to 20 carbon atoms, an aryl group containing 6 to 20 carbon atoms, an aryloxy group containing 6 to 20 carbon atoms, and a halogen atom;

$Z_1$ and $Z_2$ is each independently selected from the group consisting of an alkylene group containing 1 to 8 carbon atoms, a cycloalkylene group containing 6 to 10 carbon atoms, and an arylene group containing 6 to 10 carbon atoms;

$l_1$ and $l_2$ each independently represents an integer of 0 to 5;

Q represents a single bond or is selected from the group consisting of:

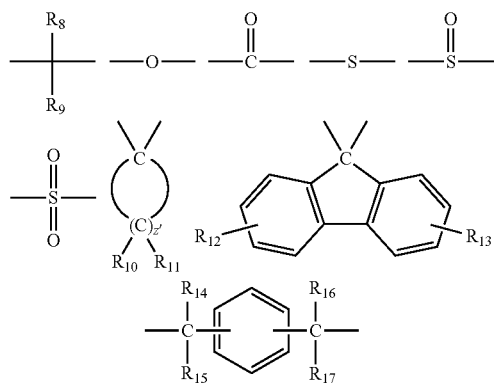

wherein $R_8$, $R_9$, and $R_{14}$ to $R_{17}$ is each independently selected from the group consisting of a hydrogen atom, an alkyl group containing 1 to 10 carbon atoms, and a phenyl group;

$R_{10}$ to $R_{13}$ each independently represents a hydrogen atom or an alkyl group containing 1 to 5 carbon atoms;

Z' represents an integer of 3 to 11; and $R_6$ and $R_7$ may be identical to or different from each other.

3. The resin composition according to claim 2, wherein the thermoplastic resin comprises the constituting unit (B), and the molar ratio between the constituting unit (A) and the constituting unit (B) is the constituting unit (A):the constituting unit (B)=20:80 to 80:20.

4. The resin composition according to claim 1, wherein, in the formula (1), both $X_1$ and $X_2$ represent ethylene.

5. The resin composition according to claim 1, wherein, in the formula (1), both $m_1$ and $m_2$ represent 1.

6. The resin composition according to claim 1, wherein the compound represented by the general formula (1) is selected from the group consisting of 9,9-bis(4-(2-hydroxyethoxy)phenyl)fluorene and 9,9-bis(4-(2-hydroxyethoxy)-3-phenylphenyl)fluorene.

7. The resin composition according to claim 2, wherein, in the formula (2), both $Y_1$ and $Y_2$ represent ethylene.

8. The resin composition according to claim 2, wherein, in the formula (2), both $n_1$ and $n_2$ represent 1.

9. The resin composition according to claim 7, wherein the compound represented by the formula (2) is 2,2'-bis(2-hydroxyethoxy)-1,1'-binaphthalene.

10. The resin composition according to claim 2, wherein, in the formula (3),
$l_1$ and $l_2$ represent 0, and
Q represents:

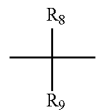

wherein $R_8$ and $R_9$ are as defined in the formula (3).

11. The resin composition according to claim 10, wherein the compound represented by the formula (3) is bisphenol A.

12. The resin composition according to claim 1, wherein the thermoplastic resin is selected from the group consisting of a polycarbonate resin, a polyester resin, and a polyester carbonate resin.

13. The resin composition according to claim 12, wherein the thermoplastic resin is a polycarbonate resin.

14. The resin composition according to claim 1, wherein the light transmittance at a wavelength of 410 nm is 50% or less.

15. The resin composition according to claim 1, wherein the weight average molecular weight of the thermoplastic resin is 10,000 to 100,000.

16. The resin composition according to claim 1, which further comprises an antioxidant and/or a release agent.

17. A molded body comprising the resin composition according to claim 1.

18. The molded body according to claim 17, which is an optical film.

19. The molded body according to claim 17, which is an optical lens.

* * * * *